(12) United States Patent  
Dossena et al.

(10) Patent No.: US 7,096,863 B2
(45) Date of Patent: Aug. 29, 2006

(54) GRANITE SLABS CUT WITH FRAME SAW EMPLOYING BLADES WITH DIAMOND-CONTAINING SEGMENTS AND METHOD OF CUTTING THEREOF

(75) Inventors: Ernesto Dossena, Melzo (IT); Markus Jakobuss, Westerville, OH (US); Andre Kuehn, Rossdorf (DE); Kurt Proske, Dreieich-Dreieichenhain (DE); Dennis Turner, Gahanna, OH (US); Michael H. Zimmerman, Westerville, OH (US)

(73) Assignee: Diamond Innovations, Inc., Worthington, OH (US)

( * ) Notice: Subject to any disclaimer, the term of this patent is extended or adjusted under 35 U.S.C. 154(b) by 0 days.

(21) Appl. No.: 10/983,467

(22) Filed: Mar. 3, 2005

(65) Prior Publication Data

US 2005/0241629 A1    Nov. 3, 2005

Related U.S. Application Data

(62) Division of application No. 10/744,690, filed on Dec. 23, 2003.

(51) Int. Cl.
*B28D 1/06* (2006.01)

(52) U.S. Cl. .................. 125/16.01; 125/21; 125/16
(58) Field of Classification Search ............ 125/16.01, 125/21, 16, 15
See application file for complete search history.

(56) References Cited

U.S. PATENT DOCUMENTS

| 2,674,238 | A   |    | 4/1954  | Dessureau |
| 3,662,734 | A   |    | 5/1972  | Sisler |
| 4,177,789 | A   | *  | 12/1979 | Marocco .................. 125/1 |
| 4,566,427 | A   |    | 1/1986  | Marechal et al. |
| 5,181,503 | A   |    | 1/1993  | Fish et al. |
| 5,443,418 | A   |    | 8/1995  | Frodin et al. |
| 5,518,443 | A   | *  | 5/1996  | Fisher .................. 451/540 |
| 6,000,387 | A   |    | 12/1999 | Lee |
| 6,033,295 | A   | *  | 3/2000  | Fisher et al. ............ 451/540 |
| 6,098,609 | A   | *  | 8/2000  | Ishizuka ............... 125/13.01 |
| 6,626,167 | B1  |    | 9/2003  | Kim et al. |
| 6,712,062 | B1  | *  | 3/2004  | Wildenburg ............ 125/15 |
| 6,817,936 | B1  |    | 11/2004 | Skeem et al. |
| 2003/0127086 | A1 |  | 7/2003  | Brauninger et al. |
| 2005/0005925 | A1 |  | 1/2005  | Dossena et al. |

FOREIGN PATENT DOCUMENTS

| EP | 1038647 A1 | 9/2000 |
| WO | WO 00/78517 A1 | 12/2000 |
| WO | WO 02/24426 A1 | 3/2002 |

* cited by examiner

*Primary Examiner*—Lee D. Wilson
*Assistant Examiner*—Alvin J Grant
(74) *Attorney, Agent, or Firm*—Pepper Hamilton LLP

(57) ABSTRACT

A graphite block cut into slabs by a sawing device comprising a plurality of generally parallel, spaced-apart blades with each of the blades having a plurality of cutting segments mounted thereon, each of the cutting segments comprising a continuous phase impregnated with a superabrasive material selected from one of natural diamond, synthetic diamond, cubic boron nitride, and combinations thereof; wherein each of the granite slabs as cut from the block has a surface roughness $R_a$ of less than 500 μ-in, and with thickness variation of 2 mm or less from a nominal slab target.

6 Claims, 5 Drawing Sheets

GRANITE SLABS CUT WITH FRAME SAW EMPLOYING BLADES WITH DIAMOND-CONTAINING SEGMENTS AND METHOD OF CUTTING THEREOF

CROSS-REFERENCE TO RELATED APPLICATIONS

This application claims priority of U.S. patent application Ser. No. 10/731,066, filed on Dec. 9, 2003 and is a divisional application claiming the benefit of and priority to U.S. patent application Ser. No. 10/744,690, filed on Dec. 23, 2003, all of which are herein incorporated by reference.

BACKGROUND OF THE INVENTION

This invention relates to an improved method for cutting slabs of granite and granite slabs cut therefrom.

FIELD OF THE INVENTION

Swing-type frame saws have been used commonly for cutting large granite blocks into slabs. These frame saws employ up to 250 steel blades mounted under tension (e.g., 80 kN) on a frame. The frame typically swings about two pivot points. In order to cut granite, the steel blades are sprinkled with slurry containing abrasive grits (like sand, steel shot or silicon carbide) and lime dispersed in water.

Cutting speeds of just a few centimeters per hour make this technique slow. For example, cutting a 2-m high block of granite at an average of 3-cm/h downfeed takes almost three days. The time requirements for cutting granite and the use of slurry containing abrasives are reasons for the consumption of large amounts of environmentally hazardous steel shot/water/lime slurry. The steel blades also have a useful life of 2–3 blocks on average, which contributes to the costs involved in cutting granite.

When steel shots are used in the slurry, it typically ranges in size from 0.1–8 mm with shapes from nearly spherical to highly angular particles, e.g., as commercially available from http://www.wheelabr.com/. In swing-type frame saw operations to cut large blocks of granite into slabs, the horizontal rectangular frame carrying a series of parallel, spaced-apart steel blades mounted under tension is oscillated about two pivot points and lowered onto a fixed block. In this prior art operation, while the blades are oscillated and lowered, slurry containing the steel shot and lime dispersed in water is continuously supplied to the contact areas between blades and block. The blades thereby pull with them the abrasive elements of the slurry, which provide cutting action by wearing slots into the block. The abrasive particles, e.g., steel shot, must travel between the blade and the walls of the cut to reach the target surface. While in the space between them, the steel particles abrade the walls of the slot. This action creates two detrimental effects: first, the wear causes the slots to widen; second, the action causes the granite surface to roughen.

Referring to a typical operation for cutting granite slabs using a horizontal frame saw equipped with a plurality of generally parallel, spaced-apart blades, the spacing between adjacent blades in the frame saw, $t_{spacing}$, is determined by the target slab thickness, $t_{slab}$, and the excess cut width, $t_{xs}$, as shown in FIG. 1. The spacing is defined by the relationship:

$$t_{spacing} = t_{slab} + t_{xs} \qquad \text{(Equation 1)}$$

As described by the relation, the greater the excess cut width, the further apart the blades must be spaced in order to achieve a target slab thickness.

Referring to the prior art operation of using abrasive slurries in the prior art with the typical abrasive particles, e.g., steel shots, used for frame sawing granite are on the order of 1–2 mm and angular. As shown in FIG. 2, the abrasive particles caught between the blade and walls cause the cut width to increase by roughly two times the largest average particle size, independent of other factors that may affect the cut width such as vibration or out-of-plane deflection of the blades.

In a prior art example employing abrasives in the slurry having an average particle size of 1–2 mm, the excess cut width, $t_{xs}$, may be expected to be twice the average particle size, or a minimum of approximately 2–4 mm. However, in practice, an excess cut width of $t_{xs}$ at least 5 mm is commonly observed. The reasons for the larger then expected excess cut width are as follows: first, multiple layers of particles may be found in the space between the blade and the block; and second, the particles are highly irregular and hence the largest particle dimensions would be a better estimate for the expected excess cut width. As the slurry containing abrasives of varying sizes is continuously supplied to the contact areas between the blades and block in the prior art granite cutting operation, the excess cut width varies with the particle sizes in the slurry being supplied to cut the slabs at the time. Consequently, the use of abrasive slurry or steel shot affects granite slab quality, with thickness variations in cut granite slabs of over 1 mm being common with use of steel shot and/or other abrasives.

Referring back to FIG. 1, the total amount of block width required to produce one slab can be expressed by the following relationship:

$$W_{block} = t_{slab} + t_{cut} = t_{slab} + t_{blade} + t_{xs} \qquad \text{(Equation 2)}$$

As an example, consider a target slab thickness of 22 mm, a blade thickness of approximately 4 mm, and an excess cut width of 5 mm. In this case, the block width required for a single slab is about 31 mm. As shown above, besides affecting the slab surface finish, the method in the prior art for cutting granite slabs is quite inefficient and wasteful with the excess cut width being almost 25% of the final granite slabs.

Besides the width of the granite cut, the quality of the granite surface is also affected by the abrasive particle size. While abrading the walls of a cut, the abrasive particles such as steel shot create a typically rough surface as illustrated in FIG. 5, which is an SEM illustrating the surface of a granite slab cut in the prior art operation. In general, the surface roughness increases with increasing size of the abrasive particles used in the operation.

Applicants have found that the use of horizontal frame saw blades equipped with diamond-containing segments economically and surprisingly produce granite slabs of a target thickness using less block per slab, while yielding granite slabs with improved surface quality. The reduction in block width required per slab is a result of reduced excess cut width, $t_{xs}$, in the operation.

BRIEF SUMMARY OF THE INVENTION

The invention relates to a granite block cut into slabs by a sawing device comprising a plurality of generally parallel, spaced-apart blades with each of the blades having a plurality of cutting segments mounted thereon, each of the cutting segments comprising a continuous phase impregnated with a superabrasive material selected from one of natural diamond, synthetic diamond, cubic boron nitride, and combinations thereof; wherein each of the granite slabs as cut from the block has a surface roughness $R_a$ of less than 1000 μ-in, and with thickness variation of less than 10% of the thickness of a nominal slab target.

The invention further relates to a method to cut a granite block into slabs having as-cut surface roughness $R_a$ of less than 1000 μ-in, and with thickness variation of less than 10% of the thickness of a nominal slab target, by employing a cutting device comprising a plurality of generally parallel, spaced-apart blades with each of the blades having a plurality of cutting segments mounted thereon, each of the cutting segments comprising a continuous phase impregnated with a superabrasive material selected from one of natural diamond, synthetic diamond, cubic boron nitride, and combinations thereof; the wear resistance property of at least one of the segments is optimized for uniform wearing of the segments along each blade during cutting by varying at least one of a) the center-to-center spacing along the length of the blade; b) concentration of superabrasive materials in each segment; c) grade of superabrasive materials in each segment as measured by compressive fracture strength; d) composition of superabrasive materials in each segment; and e) dimensions of the segment.

The invention further relates to a method for cutting granite with a horizontal frame saw having a plurality of adjacent and spaced-apart blades, each blade includes diamond cutting segments mounted on the cutting edge thereof, wherein at least one of the segment variables is optimized/controlled for uniform wearing of the segments along each blade during cutting.

DETAILED DESCRIPTION OF THE INVENTION

The invention relates to an improved method for cutting granite without the requirement of steel slot slurries in the prior art, for granite slabs with improved surface quality and uniform thickness.

Figure 1:
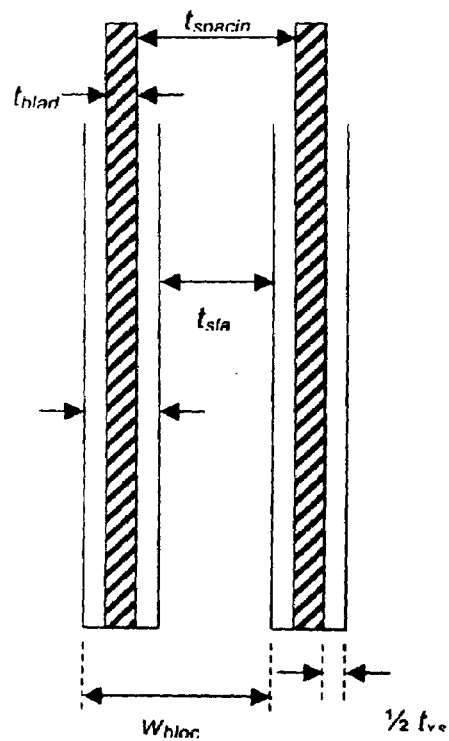
FIG. 1 is a sectional schematic view showing two adjacent saw blades in a granite cutting operation.
Figure 2:
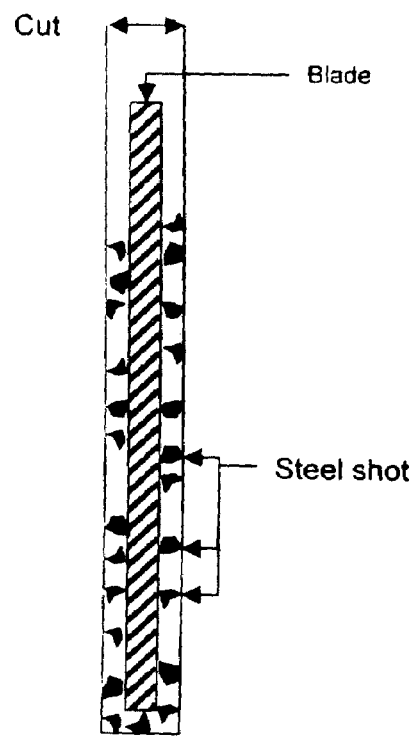
FIG. 2 is a sectional schematic view showing a prior art operation employing steel shots.
Figure 3:
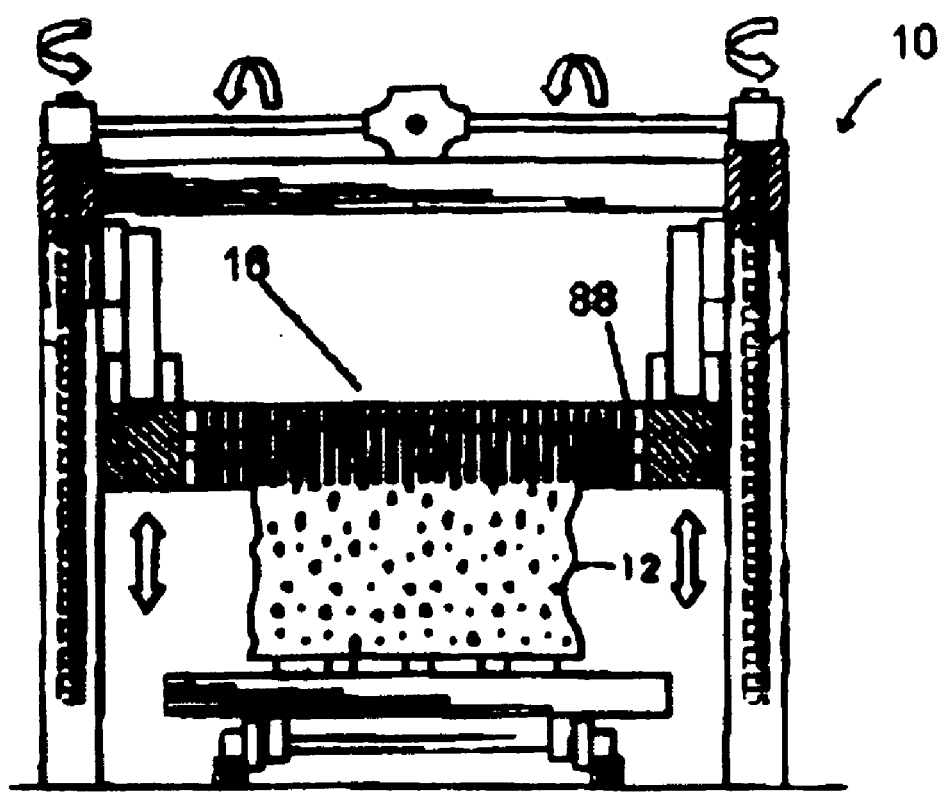
FIG. 3 is a sectional view of the horizontal frame saw of the present invention, cutting through a granite block.
Figure 4:
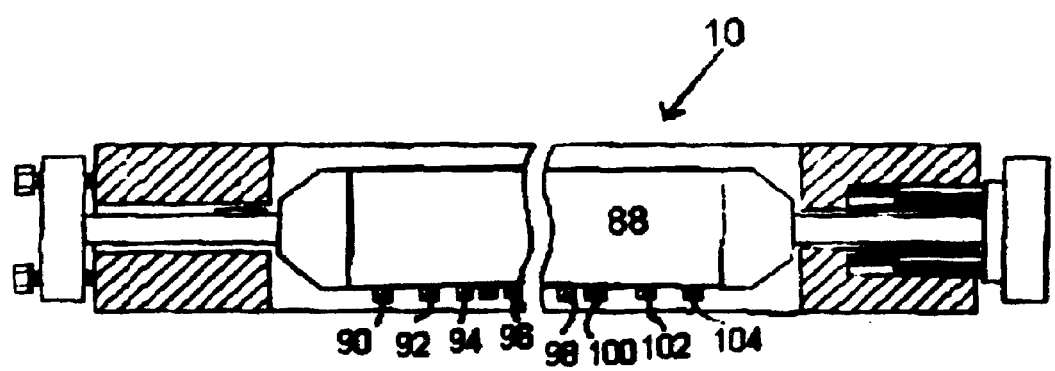
FIG. 4 is a cut-away sectional view of the saw blade and the diamond segments with un-even spacing.

Method for Cutting Granite Slabs with Frame Saw Employing Superabrasives Segments. In the improved method of the invention, a horizontal frame saw employing cutting edges with diamond-containing segments is used for cutting granite slabs. In one embodiment of the invention and as illustrated in FIGS. 3 and 4, the horizontal frame saw 10 is equipped with a blade assembly 16 having a plurality of generally parallel, spaced-apart blades 88 for cutting granite 12, wherein each of the blades 88 has a cutting edge with diamond cutting segments 90-104 mounted thereon for engaging the granite with a swinging motion for cutting of the granite.

Blades 88 may be made with high performance steel alloys known in the art. In one example, a steel alloy of 0.7 to 2.3% carbon, 0.08 to 2.0% aluminum and 0.7 to 6.5% vanadium. In another example, a steel alloy of 0.32% carbon, 0.35% silicon, 0.70% manganese, 1.00% chromium, 2.00% molybdenum, 0.6% nickel, 0.15% vanadium and 0.05% tungsten, the remainder being iron. In a third example, a steel alloy containing from 7 to 20% of tungsten, molybdenum, vanadium and niobium. Blades 88 in one embodiment, each has a height ranging from about 50 to 500 mm. The blades may be of various shapes known in the art, rectangular in most embodiments, double concave (hourglass), convex/straight, concave/straight, double convex, convex/concave, and combinations thereof.

In one embodiment, the cutting segments are fabricated from a hard continuous phase material that is impregnated with the superabrasive materials, i.e., natural diamond, synthetic diamond, or cubic boron nitride.

In another embodiment, the continuous phase material further comprises a metal carbide, a refractory metal alloy, a ceramic, copper, a copper-based alloy, nickel, a nickel-based alloy, cobalt, a cobalt-based alloy, tin, tungsten, titanium, a titanium-based alloy, iron, an iron-based alloy, silver, or a silver-based alloy, or combinations thereof.

In yet another embodiment, the continuous phase material in the segments may be impregnated with a combination of various types of abrasive materials, i.e., secondary abrasives materials such as ceramics and aluminum oxides. The continuous phase material and the superabrasives, i.e., diamonds or CBN, may be aggregated into the final segment shape by known processes that bond the continuous phase material and the particles of superabrasives/abrasives together, such as sintering, hot isostatic pressing, laser melting, or ion beam melting.

The concentration of the superabrasive materials in the segments ranges from 10 to 50 concentration. In one embodiment, the concentration is between 15–40 concentration. In another embodiment, between 20 to 30 concentration. As used herein, 100 concentration conventionally being defined in the art as 4.4 carats/cm$^3$ with 1 carat equal to 0.2 g, wherein the concentration of superabrasive grains is linearly related to its carat per unit volume content.

In one embodiment, the superabrasive materials are natural or synthetic diamond particles, or a combination thereof, ranging in size from 20 mesh to 400 mesh. In a second embodiment, the superabrasive particle size is about 25 mesh to 100 mesh. In yet another embodiment, the superabrasive particle size is between 25/30 mesh to 70/80 mesh.

In one embodiment, the diamond in the cutting segments has a toughness index ("TI") ranging from between about 20 and 90. In a second embodiment, the diamond has a TI ranging from about 25 to 80. Toughness index" ("TI") is measured using a standard friability test. The friability test involves ball milling a quantity of product under controlled conditions and sieving the residue to measure the breakdown of said product. The TI is calculated as the weight of residue greater than a target size divided by the starting weight, then multiplied by 100.

In yet another embodiment, the segments contain diamond particles coated with a layer of a material of composition, $MC_xN_y$, where M is a metal, C is carbon having a first stoichiometric coefficient x, N is nitrogen having a second stoichiometric coefficient y, and $0 \leq x$, and $y \leq 2$, where M is one or more of a transition metal, a Group IIIA metal, or a Group IVA metal. Such metal coatings are known to increase the strength with which the superabrasive material bonds to the continuous phase material.

In one embodiment of the frame saw, the diamond cutting segments on the saw blades range in size from about 5 to 100 mm in length, by 5 to 30 mm in height, by 4 to 8 mm in thickness. In another embodiment, the diamond segment is thicker than the thickness of the blade. In yet another embodiment, the saw blade includes a plurality of recesses configured to receive at least a portion of the segments.

In one embodiment, the diamond segments are spaced (center to center) from about 80 mm to 150 mm apart. In another embodiment, the center to center spacing is about 100 to 140 mm. In yet another embodiment, the center to center spacing is about 120 to 130 mm.

The segments can be in any convenient shape including, e.g., rectangular, tapered, sandwich, tooth-shaped, L-shaped, semi-circle shaped, and the like. The segments may be shaped by techniques known in the art, such as by sintering, casting, forging or machining.

The segments are attached to the blade edge by means known in the art, including brazing, soldering, welding, adhesives, mechanical affixation, and the like.

Diamond segments on horizontal frame saw blades, as used in cutting diamond slabs, do wear out at different rates. As it is desirable to have the diamond segments on a saw blade wear out at a rate as uniform as possible, in one embodiment of the invention, the spacing of the diamond segments is optimized along the saw blade with non-uniform spacing. In locations along the length having a propensity for higher wear rates, a greater number of segments per unit length are mounted. Conversely, in locations along the blade length having a propensity for lower wear rates, a smaller number of segments per unit length are mounted. As used herein, "non-uniform spacing" means that there is a variation of at least 1 mm from the minimum center-to-center spacing distance X1 (between two adjacent diamond segments on a saw blade) to the maximum center-to-center spacing distance X2 between two adjacent diamond segments on the same saw blade, i.e., X1 is 1 mm less than X2. In another embodiment of the invention, the spacing variation is at least 2 mm between a minimum center-to-center spacing between two adjacent segments to a maximum center-to-center spacing between two different adjacent segments on the same saw blade.

In conjunction with varying the spacing of the diamond segments, or as a separate approach to prolonging the service life of saw blades, diamond segments with varying properties may be distributed along the length of the blade (with either uniform or non-uniform spacing). In locations along the length having a propensity for higher wear rates, segments with higher wear resistance are mounted. Conversely, in locations along the blade length having a propensity for lower wear rates, segments with lower wear resistance are mounted.

As used herein, "variable wear-resistant property" means that there is a variation of at least 10% in a variable contributing to the wear resistance property of the diamond segments on a saw blade, from one diamond segment to another diamond segment on the same saw blade. Examples of variable wear-resistant properties including a) diamond concentration in the bond; b) diamond size; c) diamond grade, in which the wear resistance increases with increasing diamond grade, as measured by compressive fracture strength "CFS"; d) crystal strength and shape; e) segment dimension in terms of length in which the wear resistance increases with increasing segment length, where length is defined as the segment dimension parallel to the blade length when attached as in FIG. 4; f) bond wear resistance of the materials constituting the bond; and g) presence of secondary abrasives with the wear resistance increases with increasing concentration of secondary abrasives.

Improved Quality of Finished Granite Slabs: The use of segments comprising diamonds in saw blades surprisingly allows granite to be cut without the need of steel shot slurries. Such use also surprisingly granite slabs to be cut with improved surface As is known to one skilled in the art, the roughness of a finished surface depends on a variety of factors, including particle size of the abrasive medium. In general, the surface roughness increases with increasing size of the abrasive particles used in the operation. As previously cited, steel shot particles used for granite slabbing in the prior art can range from roughly 1–2 mm in nominal size. While abrading the walls of a cut, the steel shot creates a typically rough surface. Roughness properties of stone products such as granite slabs, blocks, etc., may be measured by various analytical instruments in the art, including the use of a profilometer for surface topography measurements such as $R_a$, $R_{max}$, and $R_{z-d}$ across a distance on the sample.

The profilometer's sensitive stylus runs across the width of the sample, recording variations in surface topography. An arithmetic average of these variations is displayed/recorded. $R_a$ is the arithmetical average roughness value. $R_z$ is the ISO 10-point height parameter, measured over a single sampling length and is itself an average of several peak values. $R_{max}$ is the maximum peak-to-valley height with in a sampling length.

In one embodiment of the invention, the frame saw employing the diamond segments of the present invention allows the cutting of granite for slabs having surface roughness $R_a$ of less than 1000 µ-in, an $R_z$ value of less than 7,000 µ-in, and an $R_{max}$ value of less than 10,000 µ-in. In another embodiment, the granite slab cut using the diamond containing segments of the invention display a surface roughness $R_a$ of less than 800 µ-in, $R_z$ and $R_{max}$ values of less than 6000 µ-in. In a third embodiment, granite slab cut displays a roughness $R_a$ of <500 µ-in, and $R_z$ and $R_{max}$ values of less than 5000 µ-in. In a fourth embodiment, the measured surface roughness is an improvement of at least 70% over the prior art steel shot process, for a surface roughness $R_a$ of <400 µ-in, and $R_z$ and $R_{max}$ values of less than 4000 µ-in.

As indicated above, the frame saw of the invention allows the as-cut (or sometimes called preliminary) granite slabs to have a surface roughness that is much finer than the as-cut slabs cut with a frame saw of the prior art, less material needs to be removed to achieve the target finish. This lessens the requirements of a finish polishing system wherein the initial polishing steps may be eliminated entirely from the polishing operation. In this case, the cost of the polishing operation can be reduced while also increasing the speed and capacity. Another added advantage to the frame saw of the present invention is that less damage is imparted to the granite with improved surface quality/polish quality, since fewer cracks are generated between adjacent grains of the phases that comprise the granite.

Improved Block Utilization when Cutting Slabs: It is also found that the frame saw of the invention allows more economic operations. Slabs of a target width may be produced using less of the block, due to the reduction in excess cut width, $t_{xs}$.

The reduction in excess cut width, $t_{xs}$, helps improve block utilization as well as with the uniformity of the finished granite slabs, with the as-cut granite slabs being more uniform in thickness. In one embodiment of the invention, the as-cut granite slabs have a mean thickness variation of less than 20% of the thickness of the nominal slab target. In a second embodiment, the mean thickness variation is less than 10% of the thickness of the nominal slab target. In a third embodiment, the mean thickness variation is less than 2 mm for a nominal slab target of 2 cm.

It should be further noted that the frame saw of the present invention may be used in cutting materials other than granite, including but not limited to masonry materials such as concrete, marble, sandstone, limestone, fired brick or a like material, as well as for cutting blocks of composite material made of stone or marble chippings bound together by a binder material, for improved surface quality as well as more precise dimensions.

EXAMPLES

Examples are provided herein to illustrate the invention but are not intended to limit the scope of the invention.

Example 1

As a baseline, a block of Rosa Beta granite is cut into slabs using the steel shot frame sawing operation in the prior art. The surface quality of the slabs is measured using a profilometer. In this measurement, a Hommel Profilometer (Model T 4000) is used to measure $R_a$, $R_{max}$ and $R_{z-D}$ across a 2.5 cm sampling distance. The results are provided in Table 1:

TABLE 1

Surface roughness for granite slab cut using steel shot abrasive

| Roughness Parameter | Output |
|---|---|
| $R_a$ | 1677 μ-in |
| $R_{z-D}$ | 9145 μ-in |
| $R_{max}$ | 12673 μ-in |

Figure 5:
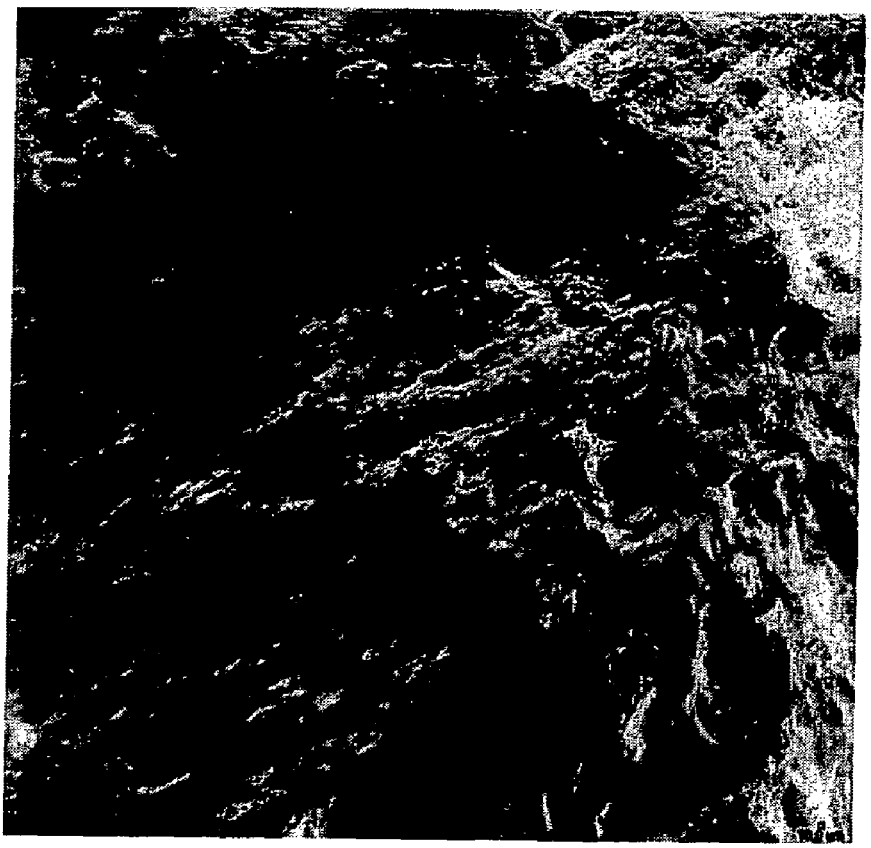
FIG. 5 is a SEM showing the surface quality of a granite slab cut via a saw blade in the prior art.

An impression of the surface of a slab cut using the steel shot of the surface of a slab cut using the steel shot process is prepared using vinyl polysiloxane. FIG. 5 is an SEM micrograph of the impression showing the rough texture of the surface.

Example 2

To evaluate the improved block utilization and slab surface roughness, a block of Rosa Beta granite is cut into slabs in Example 2, using a frame saw of the present invention having blades with diamond-containing segments attached to them. Details for the run include:

Segments: A number of runs are repeated for each example, with each run segment concentration varies between 15 to 40 concentration of diamond crystals, diamond size ranging from 20–50 mesh, in a cobalt-based bond commercially available from OMG, Eurotungstene, or other manufactures.

Each run uses segments of the same size, with segment dimensions varying for each run and ranging from 10–40 mm in length, 4–8 mm in width, and 10–30 mm in height, and with 20–30 segments per blade.

Blades: carbon alloy steel blades with $t_{blade}$=4.2 mm and n=80 blades.

Operating conditions: 30 mm/h down-feed rate; and 13–15 l/min water delivered to each blade. Nominal slab thickness target of 20 mm.

The total amount of block width per slab, $W_{block}$, is evaluated. In addition, surface roughness of a slab is measured using a profilometer as in Example 1.

Block width per slab: The total block width per slab, $W_{block}$, is determined by measuring the total width of block cut and dividing by the number of slabs produced, which is 1 fewer than the number of blades. Total block width cut=2233.6 mm; $W_{block}$=2233.6 mm/79 slabs=28.3 mm/slab.

The average slab thickness measured in this experiment is $<W_{slab}>$=22.4 mm. Referring to Equation 2, the excess cut width, $t_{xs}$, is:

$$t_{xs}=W_{block}-(t_{slab}+t_{blade})=28.3 \text{ mm}-(22.4 \text{ mm}+4.2 \text{ mm})=1.7 \text{ mm}$$

The total block width per slab when using steel shot is approximately 31 mm. For the total block width cut in this example, only 72 slabs can be produced using the steel shot technology. Hence, the block utilization of the diamond solution is approximately 10% higher than the standard steel shot technology.

Surface Roughness of Slab: A Hommel Profilometer (Model T 4000) is used to measure $R_a$, $R_{max}$ and $R_{z-D}$ across a 2.5 cm sampling distance. Results are provided in Table 2.

TABLE 2

Surface roughness parameters for granite slab cut using diamond-containing segments

| Roughness Parameter | Output |
|---|---|
| $R_a$ | 342 μ-in |
| $R_{z-D}$ | 2826 μ-in |
| $R_{max}$ | 3515 μ-in |

As shown, the measured surface roughness parameters of the slab cut using diamond-containing segments represents an improvement of between 70% and 80% relative to the steel shot process.

Figure 6:
FIG. 6 is a SEM showing the surface quality of a granite slab cut by the saw blade employing the diamond segments of the invention.

An impression of the surface of a slab cut using this diamond process is prepared using vinyl polysiloxane. FIG. 6 is an SEM micrograph of the impression of the slab of the present invention (taken at the same magnification as FIG. 5, SEM of a slab cut using the prior art technology). The SEM shows significant improvement in surface quality over the granite slabs in the prior art.

While the invention has been described with reference to a preferred embodiment, those skilled in the art will understand that various changes may be made and equivalents may be substituted for elements thereof without departing from the scope of the invention. All citations referred herein are expressly incorporated herein by reference.

We claim:

1. A granite block cut into slabs by a sawing device comprising a plurality of generally parallel, spaced-apart blades with each of the blades having a plurality of cutting segments mounted thereon, each of the cutting segments comprising a continuous phase impregnated with a superabrasive material selected from one of natural diamond, synthetic diamond, cubic boron nitride, and combinations thereof;
wherein each of the granite slabs as cut from the block has a surface roughness $R_a$ of less than 1000 μ-in and each of the as-cut granite slabs has a mean thickness variation of less than 20% of the thickness of a nominal slab target.

2. The as-cut granite slabs of claim 1, wherein each of the as-cut granite slabs has a surface roughness $R_a$ of less than 500 μ-in.

3. The as-cut granite slabs of claim 1, wherein each of the as-cut granite slabs has a mean thickness variation of less than 20% of the thickness of a nominal slab target.

4. The as-cut granite slabs of claim 1, wherein each of the as-cut granite slabs has an ISO 10-point height parameter $R_z$ of less than 10,000 μ-in and a maximum peak-to-valley height $R_{max}$ of less than 10,000 μ-in.

5. The as-cut granite slabs of claim 4, wherein each of the as-cut granite slabs has an ISO 10-point height parameter $R_z$ of less than 5,000 μ-in and a maximum peak-to-valley height $R_{max}$ of less than 5,000 μ-in.

6. The as-out granite slabs of claim 5, wherein each of the as-cut granite slabs has an ISO 10-point height parameter $R_z$ of less than 4,000 μ-in and a maximum peak-to-valley height $R_{max}$ of less than 4,000 μ-in.

* * * * *